(No Model.) 8 Sheets—Sheet 1.

A. SHIELS.
COW MILKER.

No. 556,217. Patented Mar. 10, 1896.

Witnesses
H. van Olderman
E. A. Scott

Inventor
Alexander Shiels
by Richardson
Attorneys (No Model.) 8 Sheets—Sheet 4.

A. SHIELS.
COW MILKER.

No. 556,217. Patented Mar. 10, 1896.

Witnesses
H. van Oldenneel
E. A. Scott

Inventor
Alexander Shiels
by
Attorneys

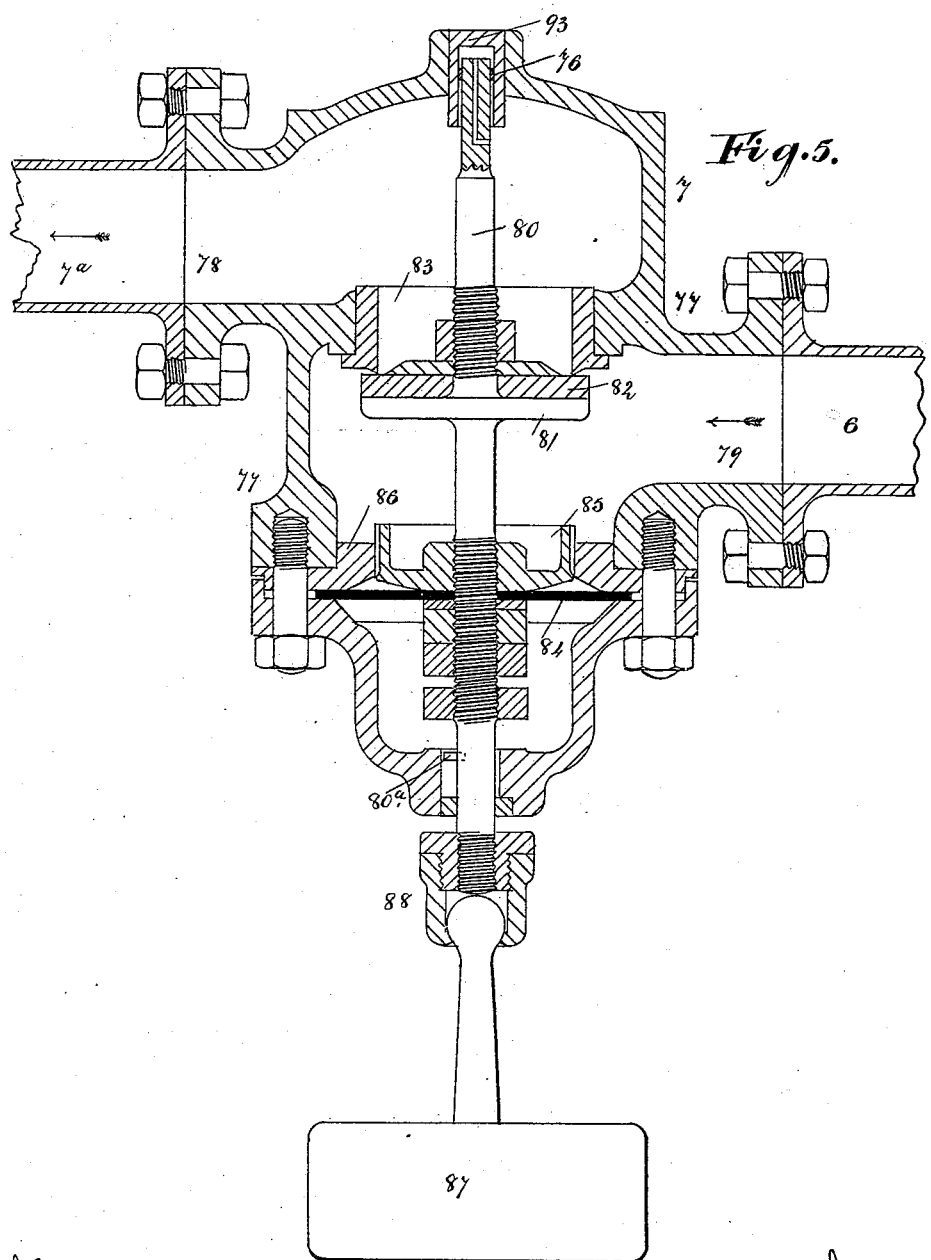

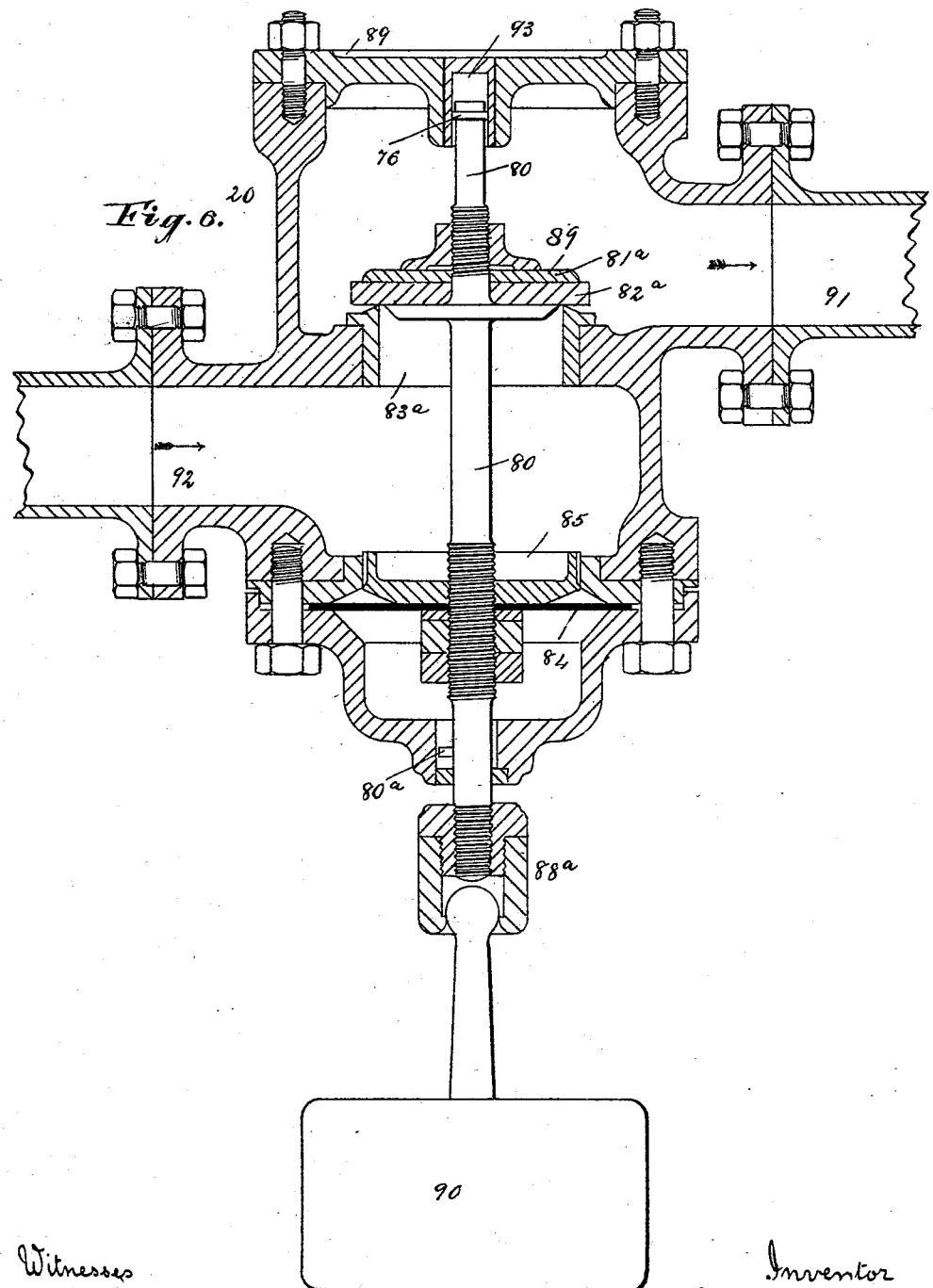

(No Model.)

8 Sheets—Sheet 7.

A. SHIELS.
COW MILKER.

No. 556,217. Patented Mar. 10, 1896.

Witnesses
H. van Oldenmeel
E. A. Scott

Inventor
Alexander Shiels

Richardson
Attorneys (No Model.) 8 Sheets—Sheet 8.
A. SHIELS.
COW MILKER.
No. 556,217. Patented Mar. 10, 1896.
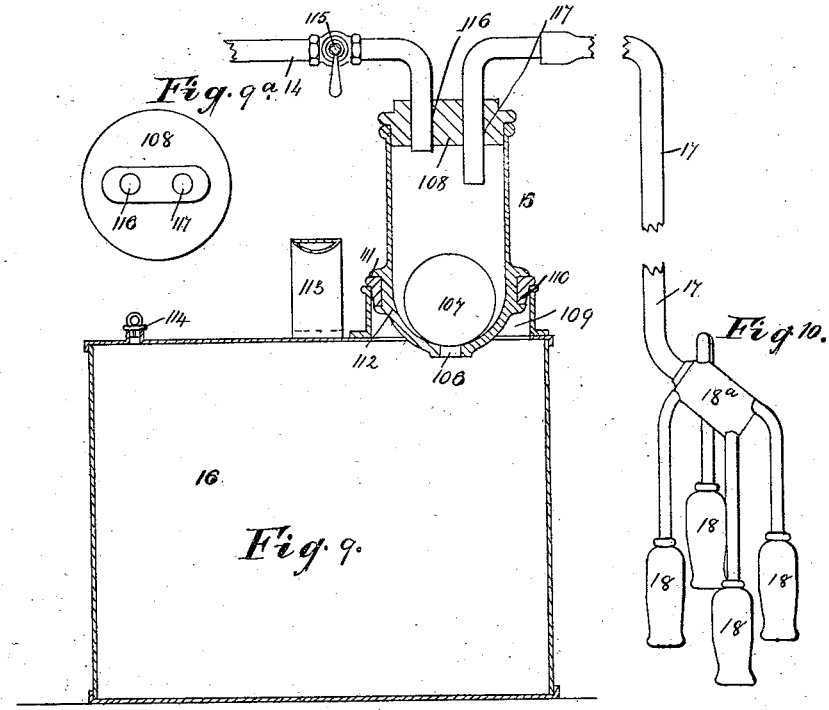
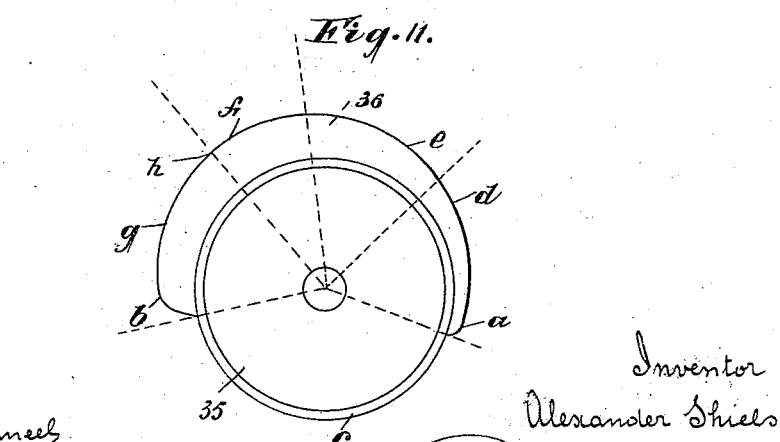

UNITED STATES PATENT OFFICE.

ALEXANDER SHIELS, OF GLASGOW, SCOTLAND.

COW-MILKER.

SPECIFICATION forming part of Letters Patent No. 556,217, dated March 10, 1896.

Application filed August 24, 1895. Serial No. 560,421. (No model.) Patented in England July 31, 1894, No. 14,638.

*To all whom it may concern:*

Be it known that I, ALEXANDER SHIELS, a subject of the Queen of Great Britain, and a resident of the city of Glasgow, Scotland, have invented certain new and useful Improvements in Milking-Machines; (patented in England July 31, 1894, No. 14,638,) of which the following is a specification.

This invention relates to that class of milking-machines wherein vacuum or suction is used as the means for withdrawing the milk from the cow's teats, and it is a development of my prior United States patents, Nos. 513,624 and 513,625, dated January 30, 1894.

The several improvements constituting the invention are pointed out in the claims at the end of this specification; and in order that my said invention may be properly understood I have hereunto appended eight explanatory sheets of drawings, whereon—

Figure 1:
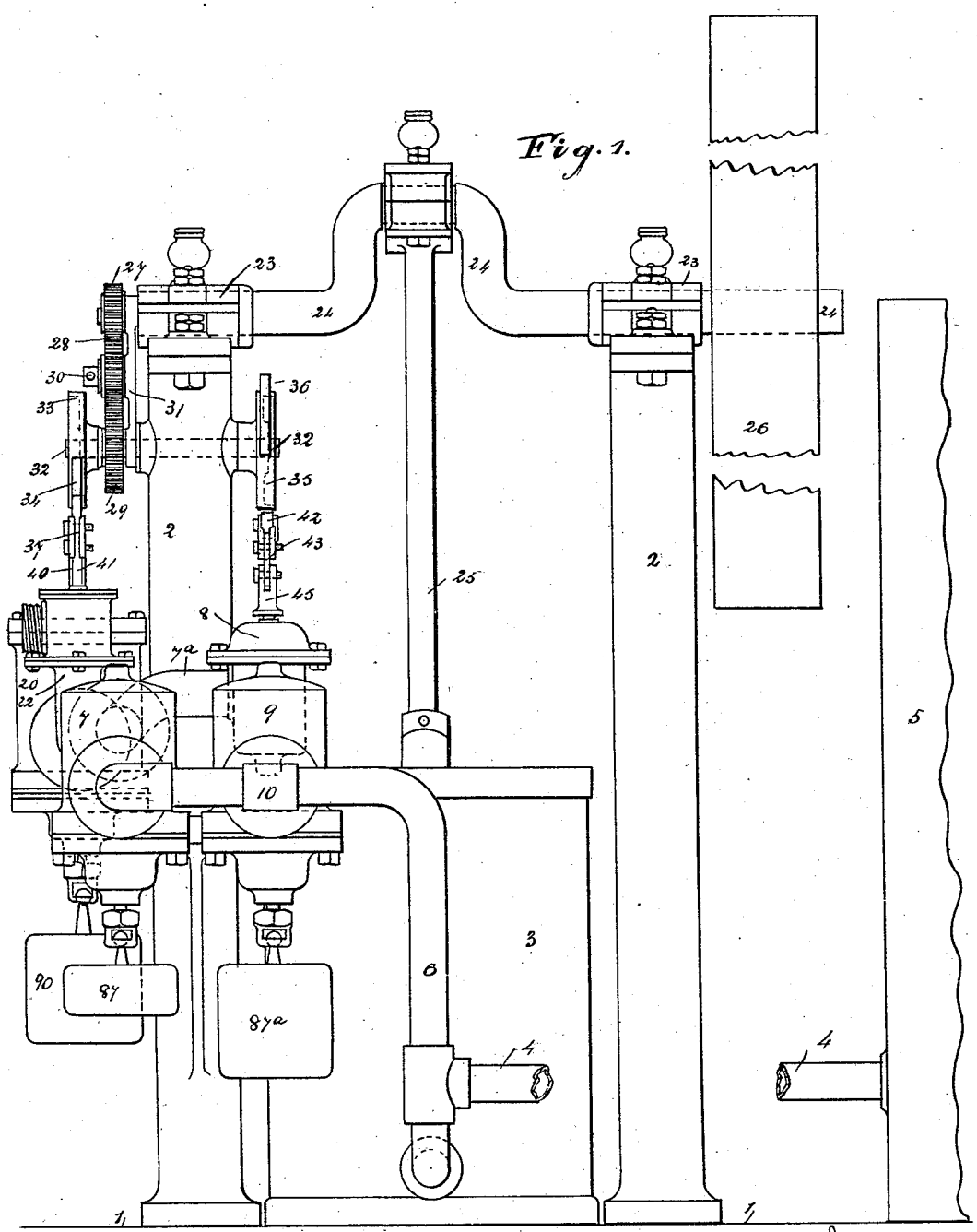
Figure 2:
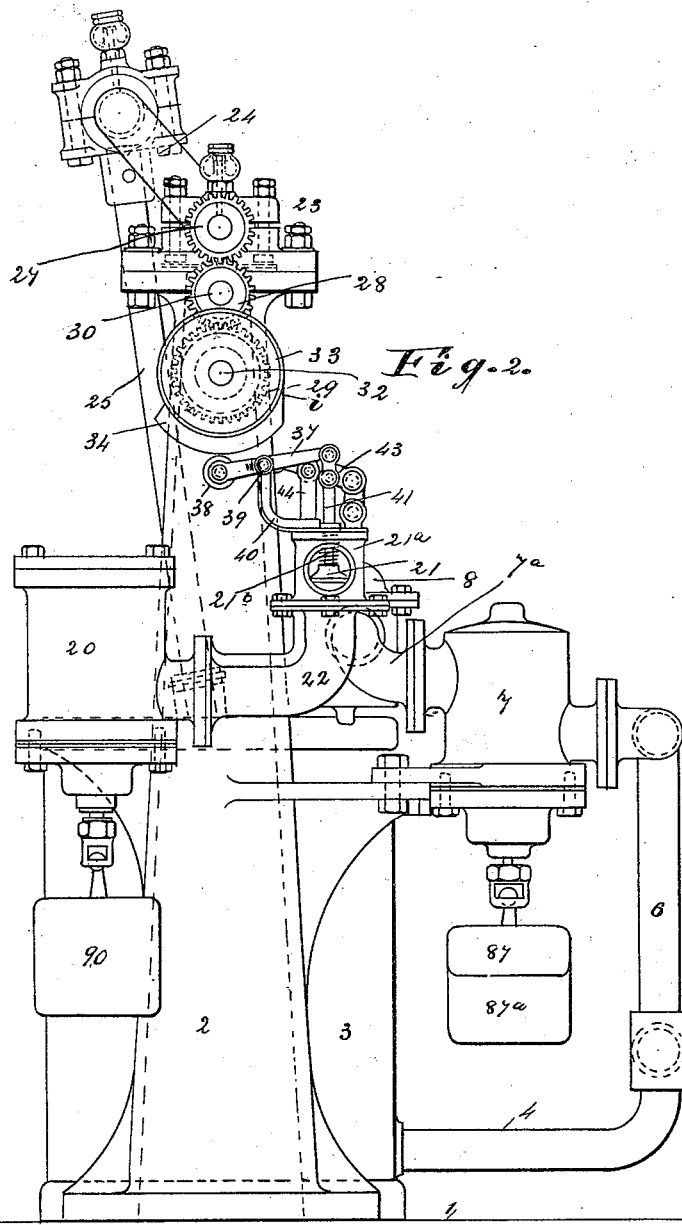
Figure 3:
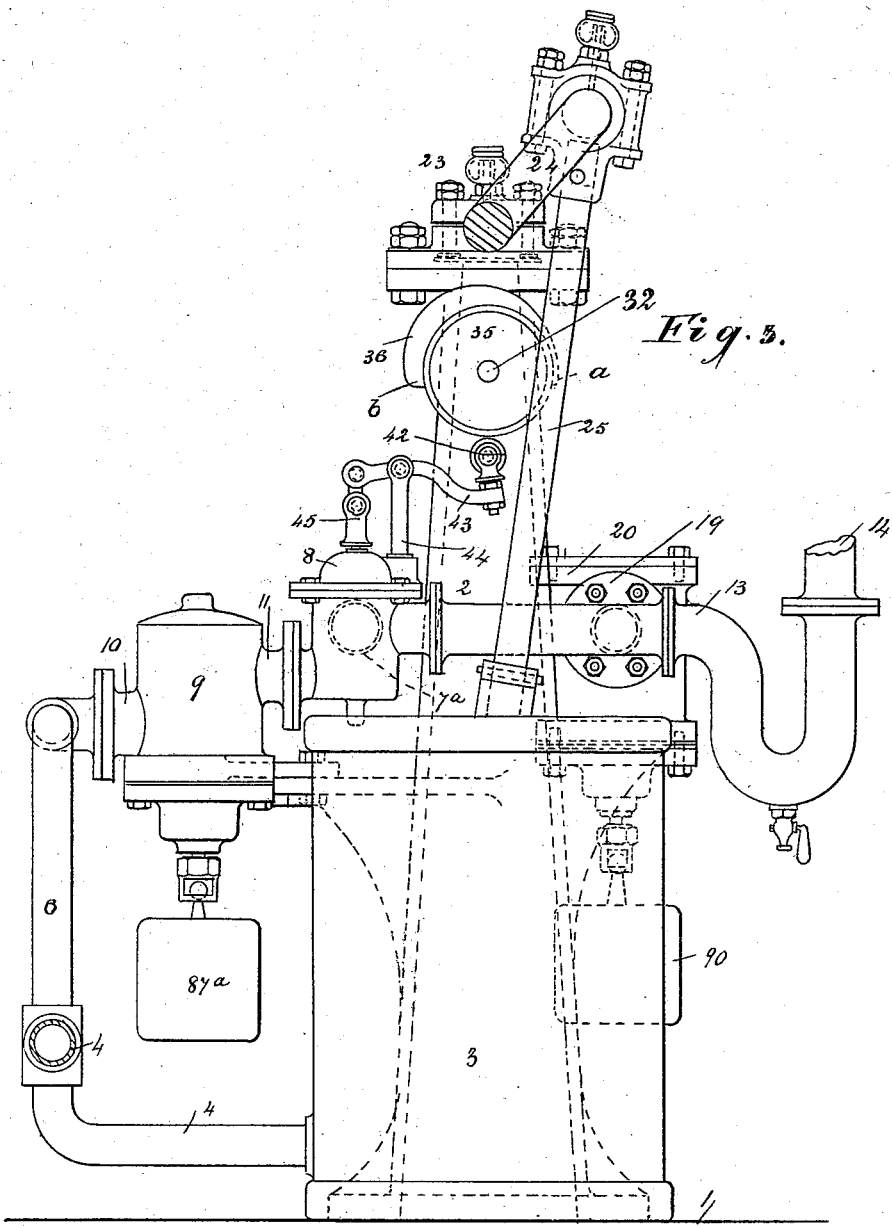
Figure 4:
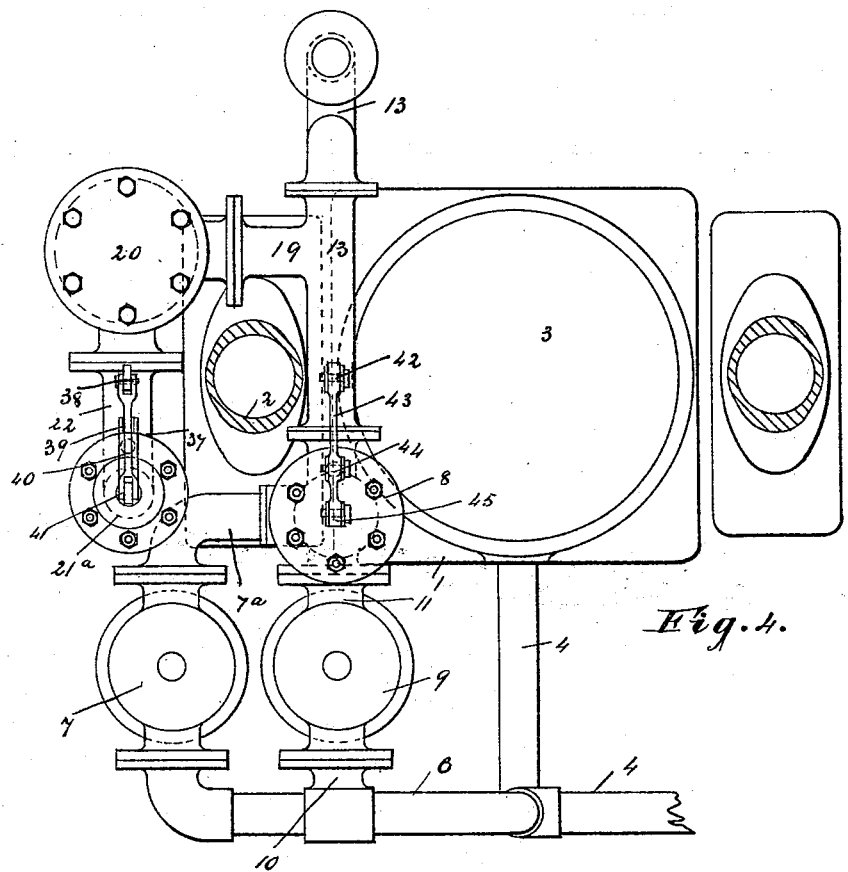
Figure 8:
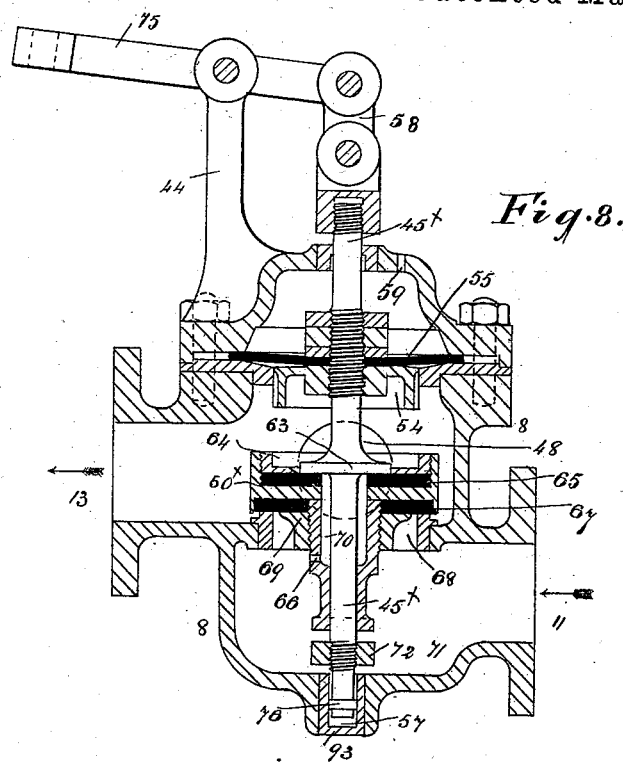
Figure 7:
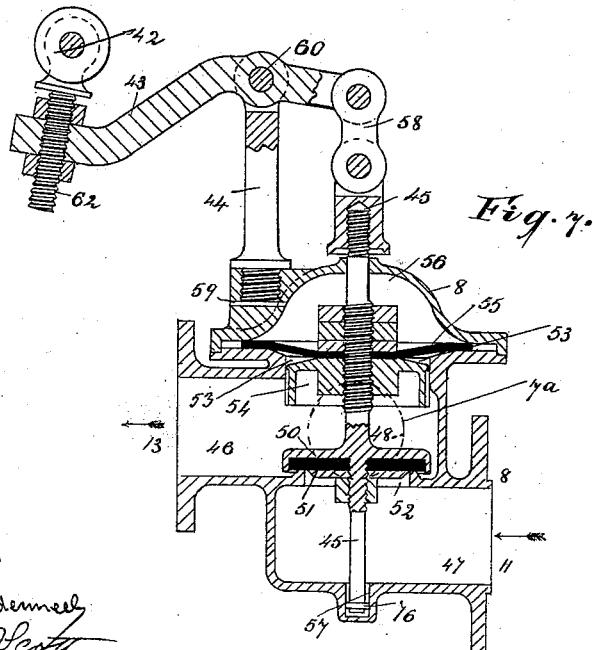

Figure 1 is a front view of the machine. Fig. 2 is a view of one side of the machine, and Fig. 3 is a view of the other side. Fig. 4 is a plan of the machine. Fig. 5 is a vertical section, drawn to an enlarged scale, of the valve 7, Figs. 2 to 4. Fig. 6 is a vertical section, drawn to an enlarged scale, of the valve 20, Figs. 2 to 4. Fig. 7 is a vertical section, drawn to an enlarged scale, of the "pulsator" 8, Figs. 3 and 4. Fig. 8 is a vertical section of a modified construction of the pulsator. Fig. 9 is a section of the milk pail or receptacle with the milk-trap 15 on top. Fig. 9ᵃ is a plan of the top of the milk-trap. Fig. 10 is a view of the teat-cups which are fitted on the cow's teats. Fig. 11 is an enlarged view of the cam-wheel 35.

Referring to the drawings, whereon the same reference letters and numerals wherever repeated indicate the same or similar parts, the milking-machine consists of a platform or foundation 1, to which two vertical cast-iron pillars 2 2 are secured. Fitted on the foundation and between these pillars is an exhaust or vacuum pump 3 of any ordinary or suitable construction. The pump communicates by a pipe connection 4 with a closed tank 5 (shown broken away in Fig. 1) and by a pipe 6 with the valve 7, pipe 7ᵃ, and pulsator-valve 8. The valve 9 is also connected by the branch pipe 10 with the pipe 6 on the one hand and by the branch pipe 11 with the pulsator-valve 8 on the other hand. The pulsator-valve is also connected by the pipes 13 14 with the milk-trap 15 and milk-pail 16, (see Fig. 9,) while the milk-trap in its turn is connected by the pipe 17 with the teat-cups 18. A branch pipe 19 connects the pipe 13 with the valve 20 and the small air-admission valve 21 connected to said valve 20 by the pipe 22. The whole of these valves and their connections are arranged around and supported by one of the pillars 2, as shown at Figs. 1 to 4.

Carried in bearings 23 23 on the top of the pillars 2 2 is a crank-shaft 24, to the crank of which the piston-rod 25 of the pump-piston is connected. On the outer end of the shaft 24 is a fly-wheel 26. The crank-shaft may be driven by power or by hand.

On the opposite end of the shaft 24 to the fly-wheel 26 is a toothed wheel 27, which gears with an intermediate toothed wheel 28, and this latter wheel 28 in its turn gears with the toothed wheel 29. The wheel 28 is carried on a stud 30 fitted in a link 31 connected loosely at the ends, respectively, to the shaft 24 and the short cross-shaft 32, which passes right through the pillar 2 and carries at one end the cam-wheel 33 with its cam-piece 34 and at the other end the cam-wheel 35 with its cam-piece 36. The shaft 32 is driven by the wheel 29, which is keyed to it.

The cam-wheel 33, as it revolves, gives at intervals a downward pressure, by means of the cam-piece 34, to the roller 38 at one end of a lever 37, which is fulcrumed at 39 to a supporting-bracket 40 cast in one with the casing 21ᵃ of the valve 21. The other end of the lever 37 is connected by a link to the rod 41 of the valve 21. The arrangement is such that every time the roller 38 is depressed by the cam 34 the valve 21 is lifted up off its seat against the action of spring 21ᵇ and communication is opened with the pipe 22 and valve 20. The other cam-wheel 35 with its tapered cam 36 (see also Fig. 11) once during each revolution gradually depresses the roller 42 at one end of a bent lever 43 fulcrumed on a jaw or bracket 44 carried by the pulsator-valve 8. The other short end of the lever 43 is connected by a link with the spindle 45 (see also Fig. 7) of the pulsator, which I will now proceed to describe.

Referring to the sectional view, Fig. 7, it will be seen that the pulsator consists of a casing in which are three passage-ways 46 47 48, (the latter indicated by dotted lines,) which communicate respectively with the pipe 13 and the teat-cups, the pipe 11 and the valve 9, and the pipe $7^a$ leading to the valve 7. Fitted in the casing is the vertical spindle 45 having on it a disk-valve 50 with a rubber face 51. This face, when the valve is shut, closes down on a ring-seat 52 formed in the casing. A hole 53, of slightly larger diameter than the passage-way in the valve-seat 52, is made in the top of the casing and in this hole 53 a cup-shaped piston 54 fitted on the spindle 45 works freely. The curved or rounded back of the piston bears against a rubber or other diaphragm 55 secured to the top of the casing by means of a dome-shaped cover 56. The top of the casing and also the lower edge of the dome-cover are beveled internally in order to permit of a free and unrestrained movement of the diaphragm. The spindle 45, at its lower end, works in a guide-recess 57, and at its upper end it projects through a central hole in the cover 56. Connected to this end is a link 58, which, in its turn, is connected to the bent lever 43 fulcrumed to the jaw 44. At the end of the lever is the screw 62 provided with the roller 42, which, as before stated, is at certain times depressed by the action of the cam 36. 59 is a passage-way by means of which atmospheric air gains access to the back of the diaphragm 55. The pressure of the atmosphere on the diaphragm 55, which is larger in area than the valve 50, tends to keep the latter closed. The pulsator cam-wheel 35 36 has five throws or movements caused by gradually increasing its diameter, as shown at Figs. 3 and 11, from the point $a$ to the point $b$. The first curve, $c$, occupies about one-third of the circumference of the wheel; the second curve, $d$, which is one of a gradually-increasing diameter, about one-sixth; the third curve, $e$, which is also a gradually-increasing one, about a sixth; the fourth curve, $f$, about an eighth, and, the fifth curve, $g$, which is a gradually-decreasing one, about one-fifth. At the end of the fifth curve, at $b$, there is an abrupt drop back to the first curve, $c$.

When the first part, $c$, of the wheel 35 is bearing on the roller 42, the valve 50 51 remains shut down on its seat 52, but when the part $d$ bears on the roller 42 it is slightly depressed, and as a consequence the valve is lifted up slightly off its seat so as to permit a slight increase of suction or vacuum to take place in the pipe 13 and to act on the teat-cups 18. When the part $e$ presses on the roller it is still further depressed, and as a consequence the valve is opened still further. When the part $f$ presses on the roller it opens the valve to its full extent, so as to allow the maximum of vacuum or suction to act on the teat-cups 18. When, however, the part $g$ acts on the roller, the valve is allowed to gradually close itself, by the action of the air-pressure on the back of the diaphragm 55, until the roller reaches the point $b$, when the valve suddenly closes and remains closed until the point $a$ is again reached. In this manner, as the cam 35 revolves, the valve $50^\times$ is gradually opened to supply vacuum from the storage-tank 5 until the maximum vacuum is reached, when, after remaining full open for a short time, it is at first gradually and then suddenly closed again, so as to reduce the vacuum to the minimum. The vacuum is thus caused to "pulsate"—$i.\ e.$, to rise from the minimum to the maximum and then again fall to the minimum. The vacuum is never allowed to fall below the minimum by the valve 7, which comes into operation when the valve $50^\times$ of the pulsator closes, as hereinafter more fully explained.

Instead of having this construction of pulsator, a device can be used, as shown at Fig. 8, which acts in a similar manner to the pulsator cam and valve and gives practically the same results. This device consists also of a casing 8, in which a valve $50^\times$ works, but the valve, in this case, consists essentially of two parts, the first part being constituted by a collar or disk 63 on the valve-spindle 45, which, when the valve is completely closed, rests on a rubber or other seating 65 on the upper side of the valve proper, 50, said seating being held in place by an internally-beveled screw-ring 64, and the second part of the somewhat cup-shaped valve $50^\times$ provided with a central opening or passage-way 70, and which has, on its under side, a rubber face 67, which, when the valve is closed, rests on a ring-seat 68 secured in the casing 8. The rubber 67 is held in place by a ring 69. The spindle $45^\times$ passes right through the valve $50^\times$ and its central opening, and the annular passage-way 70 is left between the spindle $45^\times$ and the walls of the opening. The top of this annular passage is normally closed by the collar or disk 63, while its lower part is always in communication with the vacuum-supply chamber 71 and pipe 11 by means of the hole 66. A stop 72 is screwed or fitted on to the lower end of the spindle.

A piston-and-diaphragm arrangement 54 55, similar to that of the pulsating valve, Fig. 11, is fitted at the upper end of the spindle and the whole is raised and lowered at regular intervals by means of a simple cam on the driving-shaft 24 of the machine, which, at certain times, depresses a roller, such as 42, Fig. 7, on the lever 75 and raises the spindle 45. The valve $50^\times$ is normally held against its seat by the vacuum suction at its under side. The arrangement is such that as the spindle $45^\times$ rises it at first only lifts the collar 63 off its seat and opens the annular passage-way 70 in the valve $50^\times$, thereby allowing a small increase of vacuum to take place in the passage 13 and at the teat-cups, but as the spindle $45^\times$ continues to rise it eventually, by means of the stop 72, lifts up the valve $50^\times$ and opens fully the passage 68, thereby increasing the vacuum to the maximum. When the spindle 45× again descends, the valve 50× closes first and the collar 63 subsequently, thereby gradually cutting off the vacuum at the teat-cups.

The valves 7 and 9 are of the construction shown at Fig. 5, the only difference between them being that the valve 9, which I term the "constant" valve, is more heavily weighted than the valve 7, which I term the "bypass" valve. Vacuum is automatically supplied during the operation of the machine from the storage-tank 5 through the valve 9 at a constant and regular power of suction, while the valve 7 only opens and allows vacuum to pass to the pulsator 8 and teat-cups whenever the vacuum at said teat-cups, from any cause, is reduced below the proper minimum.

As will be seen at Fig. 5, the valve 7 or 9 consists of a casing 77, which communicates on the one hand by the passage 78 with the pulsator 8, and on the other hand by the passage 79 with the vacuum-supply pipe 6. The vertical spindle 80 has on it a valve 81, with a rubber face 82, which closes against the under side of the ring-seat 83 in the central passage-way of the casing, and it is also connected to the diaphragm 84 and piston 85 working in the ring 86. The diaphragm 84 is open to atmospheric pressure on its under side. The weight 87 is attached to the lower end of the spindle 80 by a ball-and-socket joint 88. The weight 87ª of the valve 9 is larger than the weight 87. (See Figs. 1 to 4.) A guide-pin 80ª, working in a groove, prevents the spindle 80 turning around.

The valve 20, Fig. 6, only differs from the valves 7 and 9 in that its valve 81ª (faced with rubber 82ª) closes down on the upper edge of the ring-seat 83ª. It has a flat top 89. Its weight 90 is secured to the spindle by a ball-and-socket joint 88ª. The valve communicates on the one hand by the passage 91 with the pipes 19 and 13, and on the other hand by the passage 92 with the pipe 22 and valve 21.

The weight 87ª on the valve 9 is just large enough to overcome the suction in the passage 78 and retain the valve constantly open, so as to keep up a regular maximum supply of vacuum to the pulsator 8, while the weight 87 on the valve 7 is not heavy enough to keep the valve open against the suction on its upper side, unless the suction at the teat-cups from any cause decreases below the desired minimum when it opens and supplies increased vacuum until the minimum is again reached. In the case of the valve 20, however, the weight 90 is so arranged that as long as the vacuum in the passage 91 and pipes 19 13 and teat-cups is above the desired minimum the suction on the upper side of the valve 81ª 82ª is sufficient to overcome the action of the weight and keep the valve open, but immediately the vacuum reaches the minimum the weight 90 overcomes the reduced vacuum and automatically shuts the valve. The sizes of the different weights 87, 87ª and 90 are so proportioned to the work to be performed and to each other that the vacuum at the teat-cups is always properly controlled.

A feature of the invention relates to certain improvements in the construction of the regulating-valves 7, 9, and 20 used in the machine. It has been found, in practice, that on account of the rebound of the valves as they strike their seats the vacuum pulsations are apt to be a little irregular and are liable to fluctuate slightly. To overcome this I increase the friction, preferably at the top of the spindle, by making said spindle with a friction-collar 76, which works in a removable brass liner-guide 93 at the top of the valve-casing. This arrangement is also shown fitted on the spindles of the pulsators, Figs. 7 and 8.

Figs. 9 and 9ª show the milk receptacle or pail 16, which has the trap 15 fitted in it. This trap consists of a cylindrical vessel having a cup-shaped bottom with a central passage-way 106 in it leading into the pail 16. Inserted in the trap is a light india-rubber ball-valve 107. The trap, which is closed at top by a preferably india-rubber bung 108, is held in place in the extension 109 of the pail by means of a rubber ring 110 secured between the beadings 111 112. 113 is the handle of the pail. 114 is an air-admission valve. The pipes 14 and 17 are passed, as shown, down through holes 116 117 in the bung 108. 115 is a valve on the pipe 14.

The teat-cups 18, which may be the same as set forth in my prior patent, No. 524,738, dated August 21, 1894, are connected to a hollow piece 18ª, fitted on the pipe 17.

I will now proceed to describe the action of the apparatus as a whole.

The crank-shaft 24 being set in motion, the pump 3 is operated and a strong vacuum produced in the reservoir 5. When the vacuum has reached its proper limit in the storage-tank 5 (indicated by a gage not shown) the valve 9 opens automatically and supplies vacuum to the pulsator 8. The teat-cups 18, Fig. 10, are now fitted on the cow's teats and the several pipe connections fitted together. The movement of the shaft 24 also operates, by means of the gearing 27 28 29, the secondary shaft 32 and causes the cam-wheels 33 35 to revolve, and the cam 36 on the wheel 35, as the latter revolves, gradually forces down the roller 42 (see also Fig. 7) and opens the valve 50, thereby allowing vacuum to pass (if I may use the expression) from the pipe 11 to the pipes 13 14 17 and teat-cups 18 and produce a suction on the cow's teats. As the valve 50 is gradually opened by the action of the cam 36 on the roller 42, the suction at the teat-cups gradually increases until at length, when the roller 42 has reached the point $h$ of the cam, it attains the maximum. Shortly thereafter, when the roller reaches the point

*b* of the cam, it is suddenly cut off by the closing of the valve 50. As the sudden closure of the valve 50 would cut off all the vacuum from the teat-cups and they would as a consequence fall off the cow's teats it is necessary to provide means whereby sufficient minimum vacuum will be supplied to them at such times. In my invention the valve 7 is used for this purpose and it is so arranged that immediately the vacuum in the pipes 13, 14 and 17, from any cause, falls or tends to fall below the minimum about necessary to retain the cups on the cow's teats, it, under the action of the weight 87, opens automatically and supplies sufficient vacuum to make up any deficiency. When, however, by the action of cam 36 the pulsator 8 is again caused to supply vacuum to the pipes 13, 14 and 17 and teat-cups, the valve 7, owing to the increased suction in the passage 78, Fig. 5, overcoming the weight 87, automatically closes until the pulsator 8 again closes, when the valve 7 automatically opens again. In this manner the valve 7 is made to supplement the action of the pulsator 8 and prevent the vacuum at the teat-cups at any time and from any cause falling sufficiently low to allow the teat-cups to drop off the cow's teats. The action of the pulsator 8, combined with the peculiar form of the teat-cups 18, causes the latter to expand and collapse on the cow's teats and produce an effect thereon the same or almost precisely the same as the hand in handmilking.

The suction, combined with the action of the teat-cups 18 on the cow's teats, causes the milk to flow during the periods of maximum vacuum pulsations along the pipe 17 and into the vessel 15, from which it flows into the milk-pail 16 and is collected there.

The trap or controlling-vessel 15 is for conserving the vacuum in the pail 16 and acts in the following manner:

When the valve 115 is opened the maximum vacuum passes from the pipe 14 through the vessel 15 and pipe 17 to the teat-cups 18. Consequently a maximum of vacuum is created within the vessel 15 and milk-receptacle 16, and, when again by the action of the cam 36 and pulsator 8 the vacuum throughout the system is reduced to the minimum the same reduction takes place in the controlling-vessel 15, but not, however, in the milk-receptacle 16, for the simple reason that, whenever the vacuum in the controlling-vessel falls, there is, as a consequence, a difference of vacuum equal to the amount of fall between that in the controlling-vessel and that in the receptacle 16, and, as the greater vacuum is in the receptacle 16, the valve 107 is retained on its seat and closes the hole 106, and so connection with the controlling-vessel 15 is cut off and partial destruction of vacuum in the receptacle 16 prevented. Milk from the teat-cups 18 flows by the pipe 17 into the controlling-vessel 15, but, since the valve 107 is closed down on its seat, it cannot gain access to the receptacle 16, it accumulates in said vessel until the vacuum due to pulsation again rises throughout the system to the maximum, when the valve 107, owing to its specific gravity being lighter than that of the milk and to the fact that the vacuum in the controlling-vessel and in the milk-receptacle is now the same, at once leaves its seat and floats in the milk. When the valve leaves its seat the milk flows into the pail or receptacle through the opening 106.

As will be seen, then, with this device, the vacuum in the milk pail or receptacle is conserved during times of low pulsation—that is to say, of reduced vacuum at the teat-cups, &c.—instead of being reduced or entirely lost at such times.

When it is desired to lift out the controlling-vessel 15 from the receptacle 16 it is necessary to pull out the small bung 114, so as to destroy the vacuum within said receptacle.

In order that the vacuum pulsations may be made as regular and decided as possible and all danger of the vacuum at the proper times not being made to fall down to the minimum by the action of the pulsator 8, the valves 20 and 21 are provided. When the roller 42 of the pulsator 8 has reached the end of the cam 36 and is just descending to the point *b*, so as to suddenly close the valve 50 and cut off the vacuum, the roller 38, Fig. 2, is just at the point *i* of the cam 34 and is just being depressed by said cam so as to open the valve 21 against the action of the spring $21^b$ and allow air to pass down the pipe 22 to the passage 92 of the valve 20, and, so long as the roller is traveling along the cam 34, which corresponds in length to the part *c* of the cam-wheel 35, said valve 21 is kept open and air has free access to the passage 92. Now, should the vacuum in the passage 91 of the valve 20 and at the teat-cups not have fallen to the minimum, the excess of vacuum at once overcomes the weight 90 and opens the valve $82^a$, thereby admitting air to said passage and teat-cups so as to reduce the vacuum to the minimum limit, when, as before explained, the valve $82^a$ again automatically closes and cuts off further air ingress, so that the minimum vacuum is maintained until the cam 36 again acts on the pulsator 8 and supplies the maximum vacuum.

Having now fully described my invention, what I claim, and desire to secure by Letters Patent, is—

1. The combination in a milking-machine of a vacuum-reservoir, means for creating a vacuum therein, a pipe connection leading from the reservoir to the teat-cups and a mechanically-operated valve located in said connection, for controlling the vacuum supply and producing vacuum pulsation at the teat-cups.

2. The combination in a milking-machine of a vacuum-reservoir, means for creating a vacuum therein, a pipe connection leading from the reservoir to the teat-cups and a mechanically-operated self-closing valve located in said connection for controlling the vacuum supply and producing vacuum pulsation at the teat-cups.

3. The combination in a milking-machine of a vacuum-reservoir, means for creating a vacuum therein, a pipe connection leading from the reservoir to the teat-cups, and a mechanically-operated diaphragm-valve located in said connection for controlling the vacuum supply and producing vacuum pulsations at the teat-cups.

4. The combination in a milking-machine of a vacuum-reservoir, mechanism for creating a vacuum therein, a pipe connection from the reservoir to the teat-cups, a pulsator-valve located in said connection and a cam operated by the mechanism aforesaid for operating the pulsator-valve, substantially as described.

5. The combination in a vacuum milking-machine of the vacuum-reservoir, the teat-cups, the pipe connection thereto from the reservoir, and the pulsator-valve comprising the casing, the spindle in the casing, the valve on the spindle and the diaphragm also on the spindle and open to atmospheric pressure, substantially as described.

6. In combination in a milking-machine, the vacuum-reservoir, the teat-cups, the connection from the reservoir to the teat-cups, and the valve controlling the vacuum-supply to the teat-cups, said valve comprising a casing, a spindle, a diaphragm on the spindle, a disk-valve composed of the two parts $50^\times$, 63, arranged to have separate movement, means for lifting the spindle and raising the part 63 first, then part $50^\times$ to supply vacuum gradually to the teat-cups, the said diaphragm being exposed to the air in order to cause the spindle to fall, seating the part $50^\times$ first and then the part 63 so as to cut off the vacuum gradually, substantially as described.

7. In combination, the vacuum-reservoir, the teat-cups, a valve controlling the vacuum-pressure at the cups, a valve for supplying vacuum to the teat-cups whenever the vacuum falls below the minimum pressure and a diaphragm exposed to the air and connected to said valve to close the same.

8. In combination, the vacuum-reservoir, the teat-cups, the pipe connection between the teat-cups and reservoir, the pulsator-valve arranged in said pipe connection, means for opening and closing the pulsator-valve and an automatic diaphragm-valve located in a by-pass pipe and arranged to open and supply vacuum to the teat-cups when the pulsator-valve is closed and the vacuum-pressure becomes reduced below the minimum, substantially as described.

9. In combination the vacuum-reservoir, the teat-cups, the pipe connecting the teat-cups with the reservoir, the pulsator-valve controlling the vacuum in said connection and the automatic valve 7 for maintaining a minimum vacuum-pressure at the teat-cups, said valve comprising the casing, the weighted spindle, the diaphragm thereon exposed to the air, the disk-valve 81 closing upwardly, and the connection 79 and 78, the weight being so proportioned as to permit the valve to remain closed while the vacuum-pressure at the teat-cups is above the minimum, substantially as described.

10. In combination the vacuum-reservoir, the teat-cups, the pipe connection between the teat-cups and the reservoir, the pulsator-valve arranged in said pipe connection, means for opening and closing the pulsator-valve and an automatic diaphragm-valve arranged to open and supply air to destroy the vacuum at the teat-cups should it rise above the maximum, substantially as described.

11. In combination, the vacuum-reservoir, the teat-cups, the vacuum-pipe connection thereto, the pulsator-valve controlling the vacuum in said connection and the valve 20 consisting of the casing, the spindle, the diaphragm 84 open to the atmosphere, the valve-disk $81^a$ closing downward on its seat, the connection 91 above the valve leading to the vacuum-pipe, the connection 92 leading under the valve, the weight on the spindle and the valve controlling the air-supply to the connection 92 and means for operating said valve, substantially as described.

12. In combination, the main shaft 24, the secondary shaft 32 driven by gearing from the main shaft, the cams 33 and 35 on the secondary shaft, and the air-admission valve and pulsator-valve operated by said cams, substantially as described.

13. In combination in a milking-machine, the pulsator-valve, the five-throw pulsator-cam 35, 36 for gradually opening the pulsator-valve, a vacuum-reservoir, the teat-cups, and pipe connections between the parts, substantially as described.

Signed at Glasgow, Scotland, this 25th day of April, A. D. 1895.

ALEXANDER SHIELS.

Witnesses:
H. D. FITZPATRICK,
WILLIAM FLEMING.